United States Patent [19]
Zavrel

[11] Patent Number: 5,585,953
[45] Date of Patent: Dec. 17, 1996

[54] IR/RF RADIO TRANSCEIVER AND METHOD

[75] Inventor: Robert J. Zavrel, Scotts Valley, Calif.

[73] Assignee: GEC Plessey Semiconductors, Inc., Scotts Valley, Calif.

[21] Appl. No.: 106,278

[22] Filed: Aug. 13, 1993

[51] Int. Cl.$^6$ .................................................. H04B 10/00
[52] U.S. Cl. ...................... 359/152; 359/145; 455/151.2; 379/56; 340/825.72
[58] Field of Search ...................... 359/113, 143, 359/145, 152, 154, 172, 174, 181–182, 189, 147; 455/74, 89, 103, 151.2; 379/56; 340/825.72; 307/311, 283; 330/59, 308; 375/88, 62, 45

[56] References Cited

U.S. PATENT DOCUMENTS

| | | | |
|---|---|---|---|
| 3,466,761 | 9/1969 | Stinchcomb | 359/145 |
| 3,657,543 | 4/1972 | Rose | 359/189 |
| 4,775,996 | 10/1988 | Emerson et al. | 379/56 |
| 4,904,993 | 2/1990 | Sato | 359/145 |
| 5,034,997 | 7/1991 | Iwasaki | 359/154 |
| 5,373,152 | 12/1994 | Domon et al. | 359/189 |

FOREIGN PATENT DOCUMENTS 2247137 2/1992 United Kingdom .................. 359/110

*Primary Examiner*—Wellington Chin
*Assistant Examiner*—Kinfe-Michael Negash
*Attorney, Agent, or Firm*—Dennis S. Fernandez; Lisa D. Noble; Rajiv P. Patel

[57] ABSTRACT

A digital, radio-frequency (RF) transceiver is modified by coupling an infra-red (IR) communication subsystem thereto. The subsystem includes an IR transmitter and receiver which may be coupled selectably by a switch to a data signal channel or source in the transceiver. Preferably, the IR receiver includes an inductor and a diode coupled in parallel, such that the IR receiver detects an IR signal, in significant part, by resonating such signal substantially at a detection or RF baseband frequency.

2 Claims, 4 Drawing Sheets

FIG. 2 *(PRIOR ART)*

IR/RF RADIO TRANSCEIVER AND METHOD

BACKGROUND OF THE INVENTION

1. Field of the Invention

The invention relates to radio electronics, particularly to improved radio transceivers combining infrared (IR) and radio-frequency (RF) communication and signal detection techniques.

2. Description of the Background Art

In conventional radio systems, data signals are modulated for communication by transceivers over allocated RF signal bands. Conventional radio systems, however, do not easily provide signal transmission or reception over IR frequencies. It would be desirable, therefore, to provide an improved radio system, and particularly, related signal detection subsystems, whereby both RF and IR signals may be communicated.

SUMMARY OF THE INVENTION

The invention resides in coupling an infra-red (IR) communication subsystem to a radio-frequency (RF) transceiver. The IR subsystem includes an IR transmitter and receiver which may be coupled selectably by a switch to a data signal channel or source in the transceiver. Preferably, the IR receiver includes an inductor and a diode coupled in parallel, such that the IR receiver detects an IR signal, in significant part, by resonating such signal substantially at a detection frequency.

DESCRIPTION OF THE PREFERRED EMBODIMENT

Figure 1:
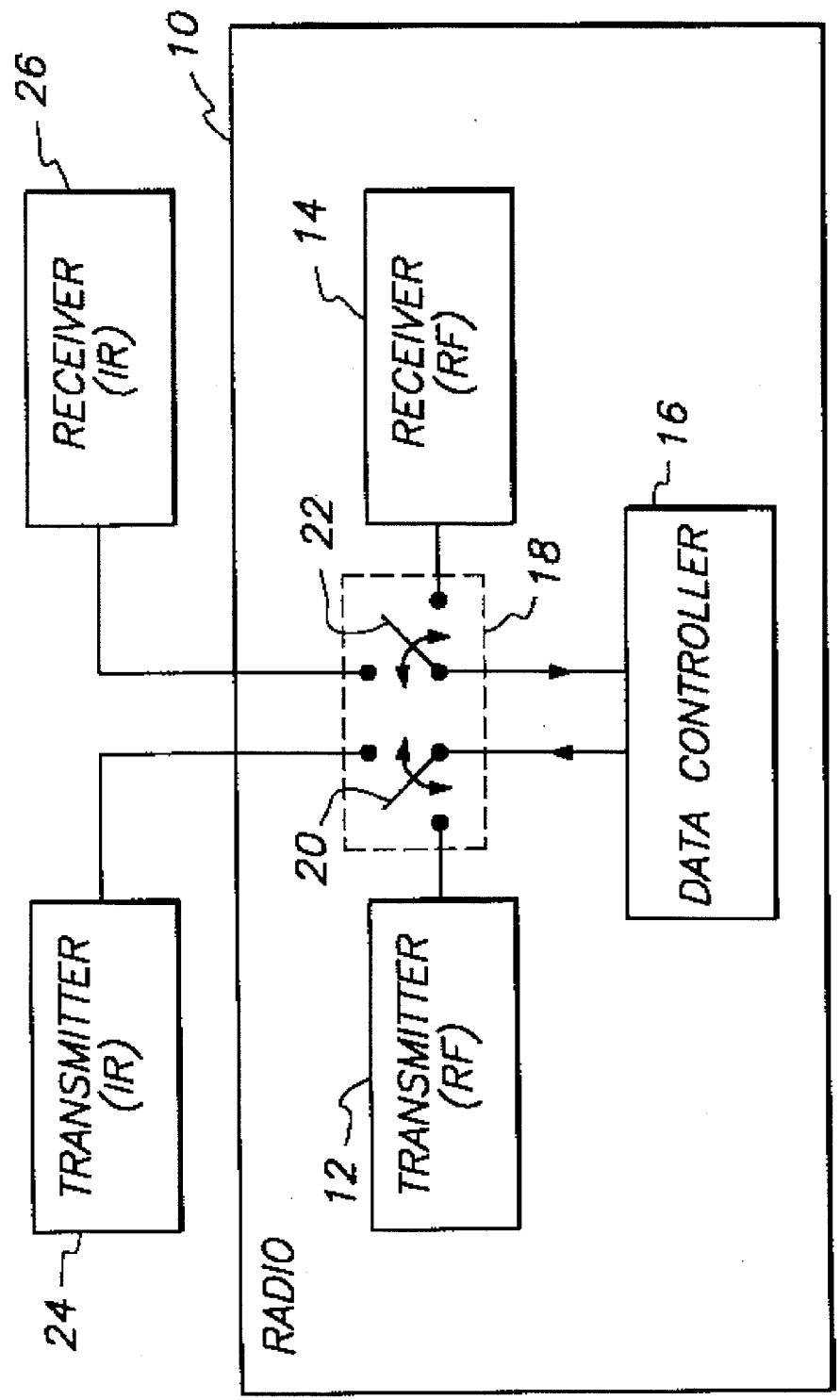
FIG. 1 is a generalized block diagram of an improved radio-frequency (RF) communication system having infra-red (IR) transmitter 24 and receiver 26.
Figure 2:
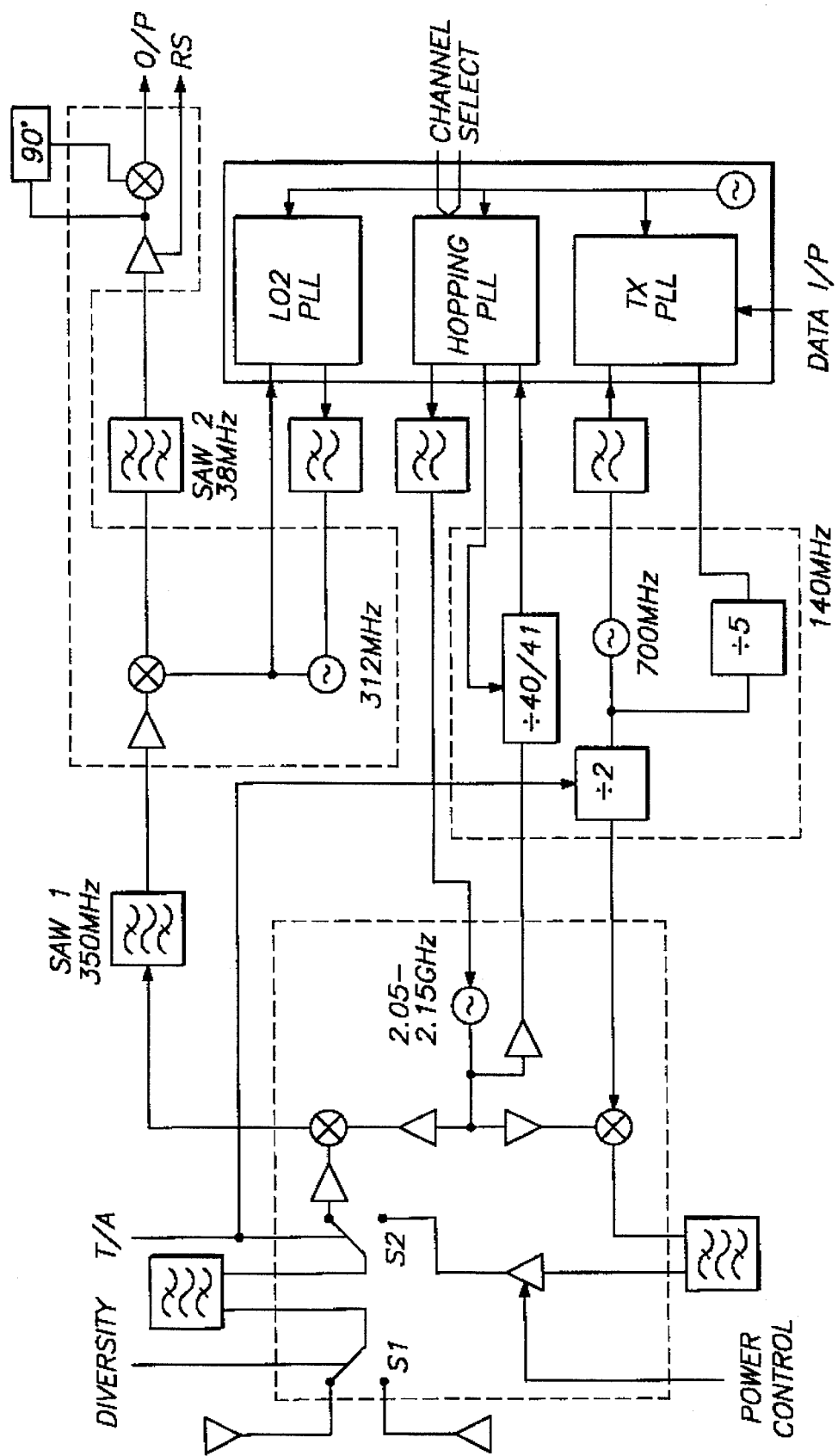
FIG. 2 is a block diagram of a prior-art digital radio transceiver, namely transceiver model DE6003 available from GEC Plessey Semiconductors.

FIG. 1 shows a generalized block diagram of an improved radio-frequency (RF) communication system 10 having infra-red (IR) transmitter 24 and receiver 26 coupled thereto. System 10 may be a conventional digital radio transceiver, such as the DE6003 Digital Radio Transceiver available commercially from GEC Plessey Semiconductors located in Scotts Valley, Calif. FIG. 2 is a generalized block diagram of the prior-art DE6003 transceiver, showing conventional components, as configured presently, prior to modification according to the present invention.

As shown in FIG. 1, system 10 contains transceiver circuitry 12, 14 for digital signal communication over allocated RF bands. Data controller 16 serves as a data signal source or receptor for sending or receiving signals to RF transmitter 12 or from RF receiver 14 respectively, in accordance with normal radio operation of system 10.

In accordance with the present invention, IR transceiver 24 and receiver 26 may be coupled user-selectably by switches 20, 22 or connecting circuit 18 to data controller 16 for signal communication therebetween. Thus, during radio operation, switch 22 may couple data controller 16 to IR receiver 26, instead of RF receiver 14, to enable data signal reception over IR spectrum, instead of RF spectrum (or vice versa). Similarly, switch 20 may couple data controller 16 to IR transmitter 24, instead of RF transmitter 12, to enable data signal reception over IR spectrum, instead of RF spectrum (or vice versa).

Figure 3:
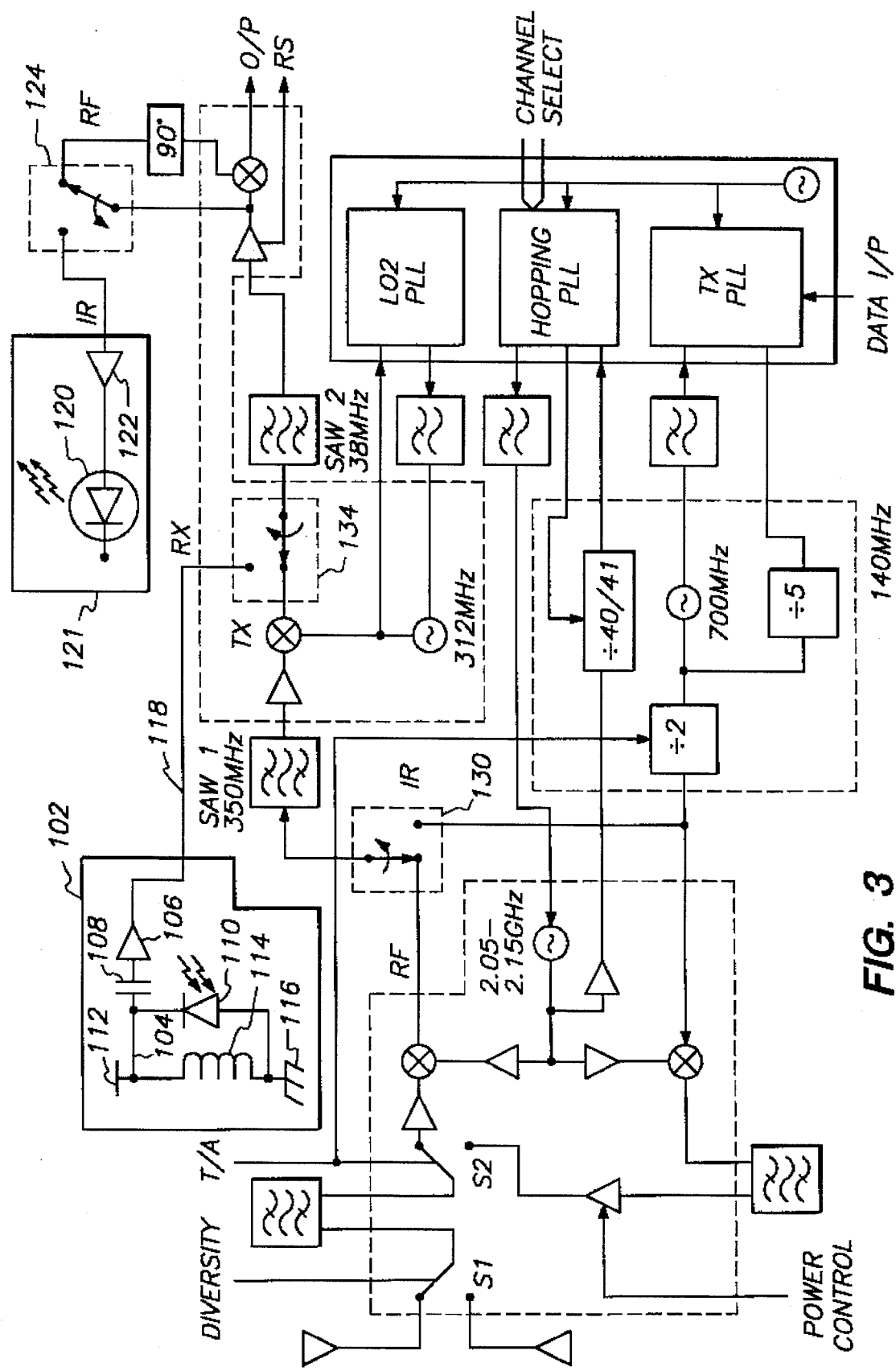
FIG. 3 is a block diagram of the digital radio transceiver shown in FIG. 2, but modified for IR/RF signal communication according to the present invention.

In FIG. 3, the DE6003 transceiver is modified functionally for coupling to IR transmitter 121, including photo-emitting diode 120 and buffer 122, or IR receiver or photo-sensitive diode 102, thereby providing combined RF and IR signal communication. In particular, DE6003 is re-configured to include IR receiver 102 and IR transmitter 121, which may be coupled to DE6003 transceiver through switch 134 and switch 124 respectively.

As shown in FIG. 3, switch 134 is switched to transmit mode (TX), but may be switched to receive mode (RX) to couple IR receiver 102 to the DE6003 transceiver. Thus, during RX mode, IR receiver 102 functions to receive IR signals for the DE6003 transceiver. Additionally, during TX mode, IR transmitter 121 functions to transmit IR signals for the DE6003 transceiver.

Furthermore, to enable changing radio operation between IR and RF transmit or receive modes, the conventional components of the DE6003 transceiver may be re-configured to include switches 130, 124, as shown in FIG. 3. In particular, switches 124, 130 may each be switched from RF transmit or receive mode, as shown, to IR transmit or receive mode. In this way, for example, during IR transmit or receive mode, switches 124, 130 are switched from the shown configuration to couple conventional components of the DE6003, thereby enabling RF transmit or receive mode.

Preferably, IR detector 102 includes inductor circuit 114 and infra-red radiation detecting photo-diode 110, of a square-law type infra-red detector, and coupled thereto in parallel. In this way, IR receiver 102 may detect an incoming, modulated IR signal, in significant part, by resonating such signal substantially at an RF baseband or carrier frequency or signal. IR detector 102 couples the resonant structure 110, 114 to power 112 and ground 116, and provides detection signal 118 through capacitor 108 and buffer 106. The received infra-red signal, which is modulated at the RF baseband, is amplitude-shift keyed (ASK), and frequency-shift keyed (FSK) by specified data.

Figure 4:
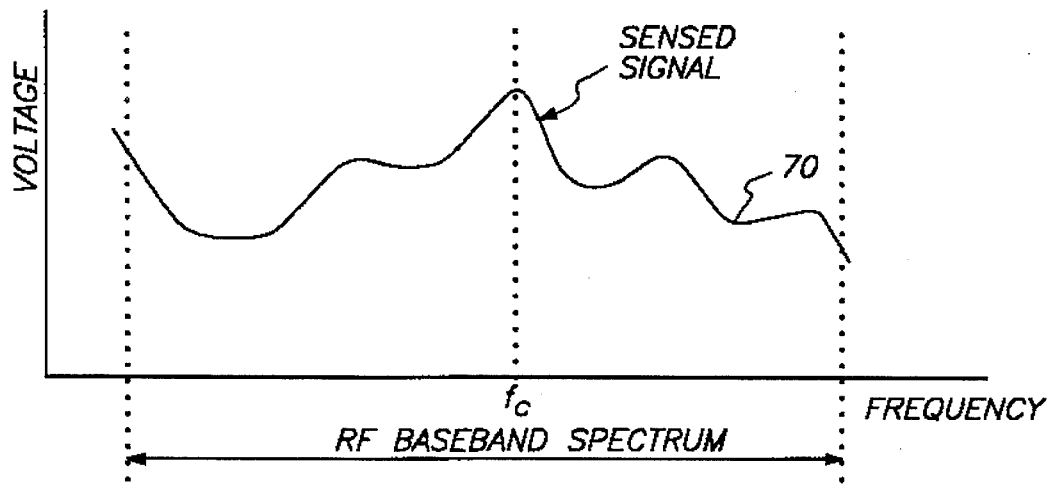
FIG. 4 is a simplified frequency response chart of sensed signal 70 according to the present invention.
Figure 5:
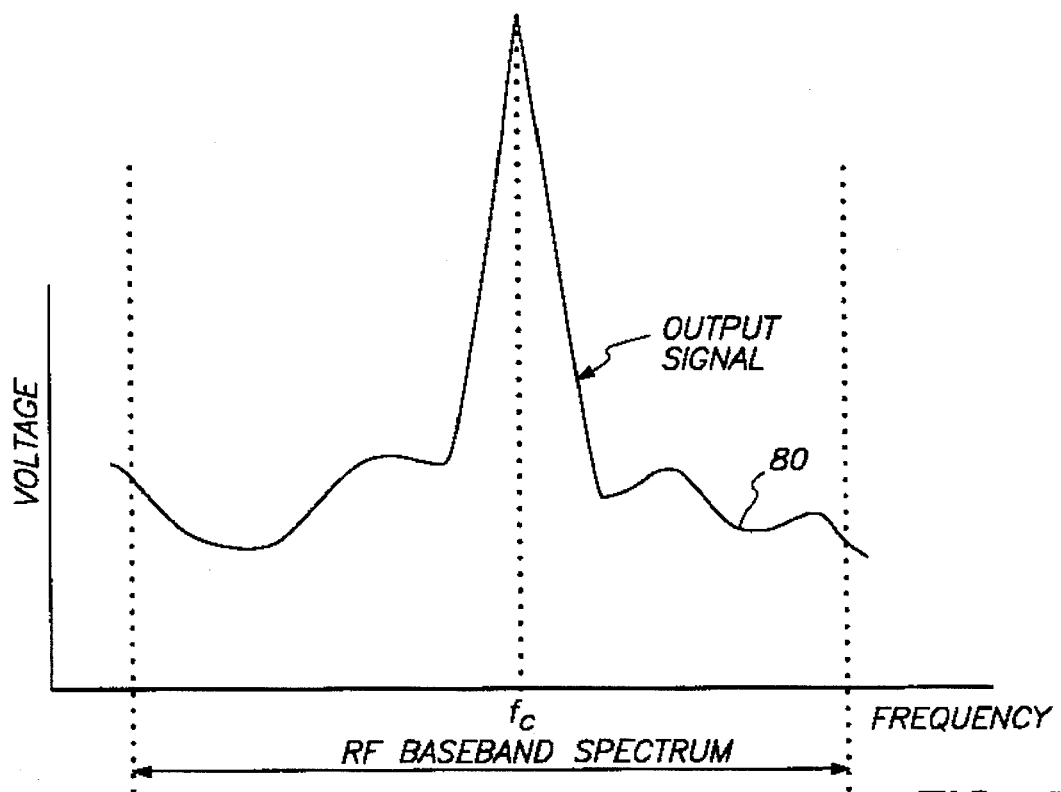
FIG. 5 is a simplified frequency response chart of output signal 80 according to the present invention.

Thus, the frequency of the RF baseband is amplified by the resonating effect of inductive circuit 114 coupled to detecting diode 110 and its inherent capacitance, and detector 102 is thereby more sensitive to data frequency-shift keyed (FSK) about the carrier signal. The increased sensitivity is illustrated in FIGS. 4 an 5, where sensed signal 70 is compared to increased-voltage output signal 80 which is resonated and amplified at a particular RF baseband frequency, $f_c$, over the infra-red spectrum at which resonance occurs.

Preferably, the incoming, received infra-red signal contains a carrier signal that is amplitude-shift keyed (ASK) and that is frequency-shift keyed (FSK) by modulating data information. The resonating effect occurs at the frequency of the carrier signal, such that output signal 118 is amplified substantially at this frequency.

Thus, when operating, a remote transmitter (not shown) emits an infra-red signal that is amplitude-shift keyed (ASK)

and that is frequency-shift keyed (FSK) by data information. The infra-red radiation-detecting diode 114 of the invention, then senses this incoming signal, possibly including present infra-red "noise." Because of such noise, it may be difficult conventionally to distinguish the carrier signal from the noise. In accordance with the present invention, however, the resonating effect at the frequency of the carrier signal facilitates IR signal detection, particularly by increasing effectively the detected amplitude of the carrier signal relative to the amplitude of the background noise.

Preferably, the frequency of the carrier signal within the infrared spectrum is "atypical" (i.e., a frequency at which levels of noise that are sufficiently high to prevent conventional IR signal detection are not usually present.) The atypical frequency may correspond to frequencies used in RF-based wide and local area networks, such that switching between RF and IR is easily accomplished. In the present embodiment, the preferred RF baseband frequency is 38 MHz.

Additionally, the data information which is frequency-shift keyed (FSK) about the carrier signal includes frequencies $w_1$ and $w_2$ which may be provided in binary form, such that such frequencies correspond to logical high or low (1/0) signals.

Thus, when operating, a remote transmitter emits an infrared signal at 38 MHz, which is amplitude-shift keyed (ASK) and that is frequency-shift keyed (FSK) by data information including a series of frequencies $w_1$ and $w_2$. Infra-red radiation-detecting diode 110 senses the incoming signal, along with infra-red noise. The resonating effect of inductor 114 together with the effective capacitance of diode 110 resonates the incoming, sensed signal at 38 MHz, which is the frequency of the carrier signal. The amplified sensed signal may then be further amplified and buffered.

I claim:

1. An apparatus for communication comprising:

an infra-red (IR) transceiver, including an IR transmitter for transmitting IR signals and an IR receiver for receiving IR signals;

a radio frequency (RF) transceiver, including a RF transmitter for transmitting RF signals and a RF receiver for receiving RF signals;

a data controller having an input and an output, the data controller receiving signals applied to the input, the data controller providing signals for transmission at the output;

a first switch having a first position and a second position, the first switch coupled to the output of the data controller, the IR transmitter, and the RF transmitter such that in the first position the first switch couples the output of the data controller to the IR transmitter and in the second position the first switch couples the output of the data controller to the RF transmitter; and a second switch having a first position and a second position, the second switch coupled to the input of the data controller, the IR receiver and the RF receiver, such that in the first position the second switch couples the input of the data controller to the IR receiver and in the second position the second switch couples the input of the data controller to the RF receiver.

2. The apparatus of claim 1 wherein:

the IR receiver comprises an inductor and an IR detection diode coupled in parallel, such that the IR receiver detects an IR signal by resonating the IR signal substantially at a detection frequency.

\* \* \* \* \*